US009150231B2

(12) United States Patent
De Jong et al.

(10) Patent No.: US 9,150,231 B2
(45) Date of Patent: Oct. 6, 2015

(54) MAINTENANCE AND RETRIEVAL CART (75) Inventors: Richard De Jong, Oakville (CA); Jerry Michilsen, Ancaster (CA); John Pollock, Mossley (CA)

(73) Assignee: Ideal Warehouse Innovations, Inc., Vaughan, Ontartio (CA)

( * ) Notice: Subject to any disclaimer, the term of this patent is extended or adjusted under 35 U.S.C. 154(b) by 0 days.

(21) Appl. No.: 14/110,810

(22) PCT Filed: Apr. 27, 2012

(86) PCT No.: PCT/CA2012/000780
§ 371 (c)(1),
(2), (4) Date: Oct. 9, 2013

(87) PCT Pub. No.: WO2012/167371
PCT Pub. Date: Dec. 13, 2012

(65) Prior Publication Data
US 2014/0035245 A1 Feb. 6, 2014

Related U.S. Application Data (60) Provisional application No. 61/479,883, filed on Apr. 28, 2011.

(51) Int. Cl.
*B62B 3/00* (2006.01)
*B65G 1/04* (2006.01)

(52) U.S. Cl.
CPC . *B62B 3/002* (2013.01); *B65G 1/04* (2013.01); *B65G 2207/40* (2013.01)

(58) Field of Classification Search
USPC .......... 414/279, 595, 607, 267, 276; 211/151, 211/126.15, 90.01; 182/141, 184, 149, 222; 280/79.11, 79.3
See application file for complete search history.

(56) References Cited

U.S. PATENT DOCUMENTS

| 3,734,311 | A | * | 5/1973 | Thompson et al. | 414/273 |
| 4,286,911 | A | * | 9/1981 | Benjamin | 414/273 |
| 4,290,730 | A | | 9/1981 | Weaver | |
| 4,298,099 | A | * | 11/1981 | Isaacs | 186/58 |
| 5,096,018 | A | * | 3/1992 | Dickinson, Jr. | 182/69.6 |
| 5,148,889 | A | * | 9/1992 | Fenwick et al. | 182/17 |
| 5,482,422 | A | | 1/1996 | Hammond | |
| 7,757,813 | B2 | * | 7/2010 | Kerr | 182/39 |
| 8,051,951 | B2 | * | 11/2011 | Bennett et al. | 182/39 |
| 8,257,008 | B2 | * | 9/2012 | Ellingson | 414/608 |
| 8,651,237 | B2 | * | 2/2014 | Pulliam | 182/141 |
| 2004/0069181 | A1 | | 4/2004 | Charbonneau et al. | |
| 2007/0261917 | A1 | * | 11/2007 | Webster | 182/148 |

FOREIGN PATENT DOCUMENTS

| CA | 2151315 | 5/1998 |
| CN | 201460182 | 5/2010 |

(Continued)

*Primary Examiner* — John Walters
*Assistant Examiner* — Brian Swenson
(74) *Attorney, Agent, or Firm* — Eckert Seamans Cherin & Mellott, LLC; Brij K. Agarwal (57) ABSTRACT

A maintenance and retrieval cart is provided for use with a push back storage rack having a plurality of nested trays riding on a pair of inclined rails. The maintenance and retrieval cart comprises a base with a safety rail secured thereto. The base is supported on an undercarriage which facilitates movement along the inclined rails. A drive mechanism is operatively connected to move the cart along the inclined rails.

21 Claims, 8 Drawing Sheets

(56) References Cited

FOREIGN PATENT DOCUMENTS

| | | |
|---|---|---|
| GB | 1049233 | 11/1966 |
| JP | 8332958 | 12/1996 |
| JP | 11229616 | 8/1999 |
| JP | 2001315908 | 11/2001 |
| JP | 2008045322 | 2/2008 |

* cited by examiner

MAINTENANCE AND RETRIEVAL CART

FIELD OF THE INVENTION

The present invention relates generally to the racking equipment for use in warehouses and distribution centres. In particular the invention relates to a maintenance and retrieval cart for use with push back rack storage racking systems.

BACKGROUND OF THE INVENTION

A distribution center for a set of products is a warehouse or other specialized building, often with refrigeration or air conditioning, which is stocked with goods to be redistributed to retailers, to wholesalers, or directly to consumers. Distribution centers are the foundation of a supply network, as they allow a single location to stock a vast number of products. Some organizations operate both retail distribution and direct-to-consumer out of a single facility, sharing space, equipment, labor resources, and inventory as applicable. Distribution centres are typically very large installations, often providing upwards of one million square feet of storage space at a single location. In order to efficiently manage the placement, storage and retrieval of products, specially designed push back storage racking systems are constructed. Typically racking systems are constructed with capacity to hold (4) four to six (6) pallets deep and in tiers to hold multiple pallets in height. The racking systems typically have a multi-level steel beam framework which supports platforms upon which pallets of goods are stored. Individual pallets of goods are accessed using lift trucks. Access to particular pallets of goods can only be achieved from the exposed end of the rack. Different types of racking systems have been developed to optimize product selection and retrieval and/or to permit high density storage.

Figure 1:
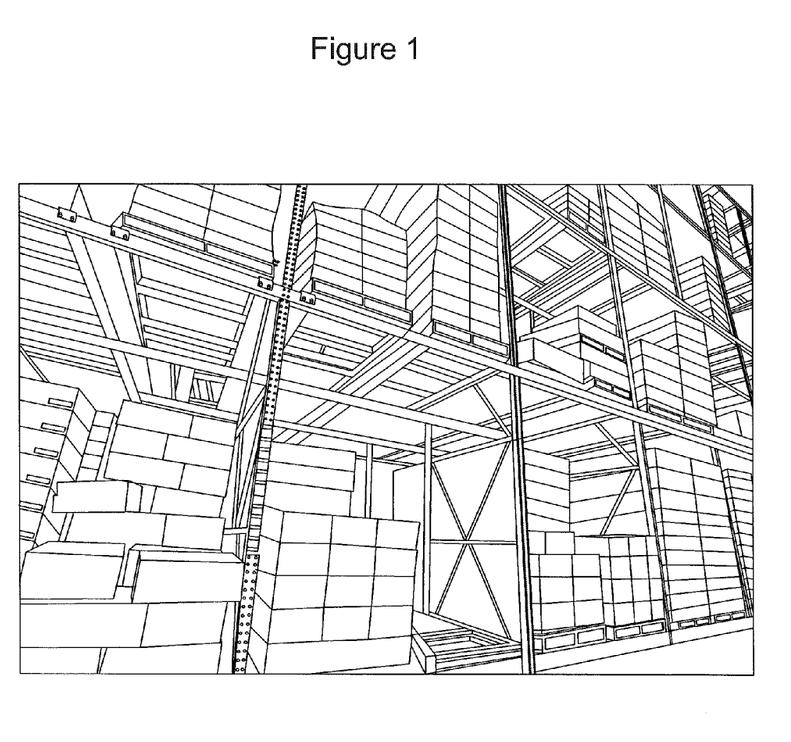
FIG. 1 is a perspective view of a portion of a row of racking in a distribution centre.
Figure 2:
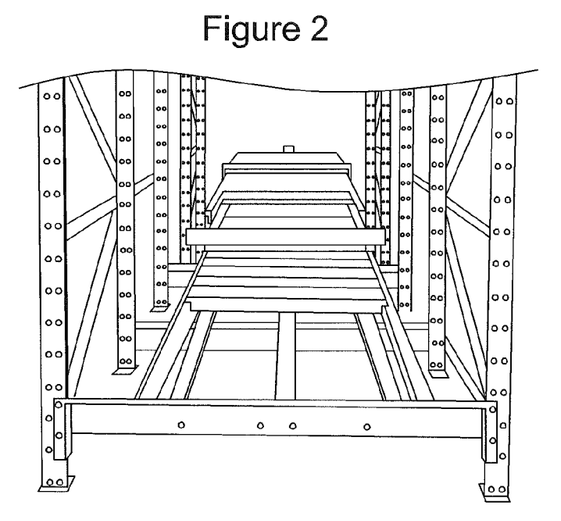
FIG. 2 is a perspective view of a push back rack for use in a racking system.

One such racking system is known as a "push back rack", shown in FIG. 1. Such systems combine high density storage with versatility. The system operates on the last in, first out (LIFO principle) and provides multiple lanes of pallet storage, each of which flow independently. As best seen in FIG. 2, in a push back rack system product pallets are placed by forklift on nested trays riding on inclined rails. Each pallet is then pushed back by subsequent pallet loading, exposing the next nested tray. When removing product, the forklift takes out the front pallet, allowing the pallets on trays behind it to roll gently (gravity fed) to the front of the rack. The nested trays make it easier to place and retrieve pallets. The operator of the forklift or lift truck does not have to enter the racking framework, instead accessing the pallets from the front of the rack. A push back rack system fills the storage area with product, not aisles. It is not necessary to maintain open aisles between each row of pallets. Instead, the nested racks in the push back rack system allow pallets to be stored up to 6 deep on the nested rack trays which roll on the inclined rails. The push back rack systems can be placed back to back thereby making it possible to store up to 12 pallets depth, with 6 pallets accessible from the front and the other 6 accessible from the back.

Typically the push back rack systems are constructed using "I" beam rails which are attached to the stacked support beams. A plurality of rack trays are mounted to the rails in nested fashion. A safety bar is provided for the last pallet stored on the rails in order to prevent a tray rolling forward off the rails and into the aisle below.

Figure 3:
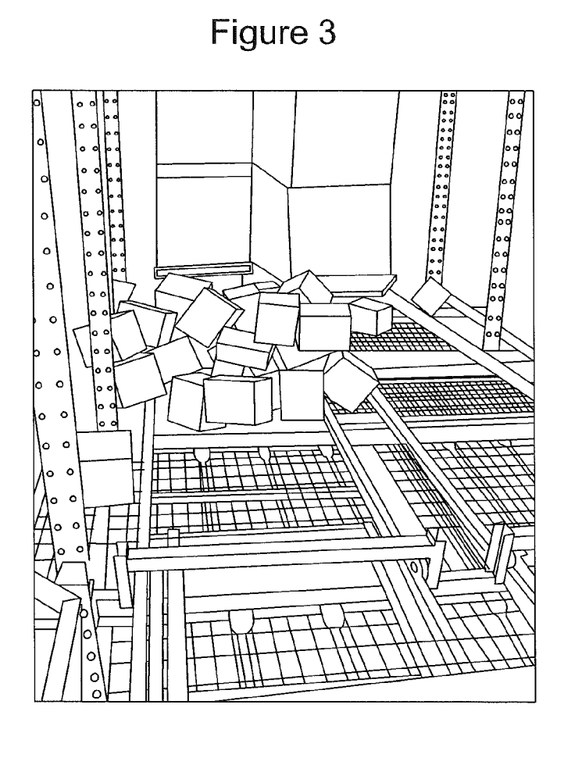
FIG. 3 is a perspective view of a jam created by fallen debris in one bay/lane of a push back racking system.

One difficulty which can occur with push back rack systems relates to rack jams. Occasionally the wrapping around goods on a pallet will become damaged and product will become dislodged from pallets. This phenomenon is illustrated in FIG. 3. With high density racking systems the dislodged products will spill into surrounding storage racks, and can become jammed in the rails or between rack trays, causing seizure of the rack trays.

At present the options for clearing jammed racks are very limited. It is extremely dangerous for an individual to attempt to climb into a racking system. Since pallets are stacked multiple rows high, the risk of a person falling while trying to access a jam is very grave. A bridge mounted to a forklift can be used to reach a short way into a racking structure to allow an individual to walk into a lane in a rocking system in order to clear jams which are close to the front. This approach cannot be used to clear jams which are located farther back in a storage lane.

Often existing jammed rack locations simply cannot be cleared safely. When jams cannot be cleared, a section of the rack must be taken out of service and cordoned off, with the result that storage capacity is lost and the profitability of the distribution centre is decreased. If storage rack locations are out of service for extended periods of time the products stored at or behind the site of the jams may expire and no longer be saleable. Product expiration results in lost revenue from the unsaleable products, and additional incurred costs to dispose of the expired product.

At present, there is no commercially available equipment that would enable operators to safely perform repair, maintenance or inspection operations of a pushback rack system or the surrounding rack structure at height It is an object of the present invention to provide a safe and economical solution for clearing rack jams.

It is yet a further object to provide a device which can be utilized to permit the safe and efficient inspection, maintenance and repair of push back rack systems.

It is yet another object of the present invention to provide a shelter which can be adjusted in size to accommodate a variety of stored items and to adjust to cramped spaces.

SUMMARY OF THE INVENTION

A maintenance and retrieval cart is provided for use with a push back storage rack having a plurality of nested trays riding on a pair of inclined rails. The maintenance and retrieval cart comprises a base with a safety rail secured thereto. The base is supported on an undercarriage which facilitates movement along the inclined rails. A drive mechanism is operatively connected to move the cart along the inclined rails.

In a first embodiment, the undercarriage further comprises cart rollers sized and positioned to ride on the inclined rails of the push back storage rack. The drive means is operatively connected to the cart rollers.

In the second embodiment, the undercarriage has a mounting surface for removably resting on one of the nested trays of the push back storage rack and the drive mechanism comprises a drive wheel operatively engaged to a traveler geared to a roller mounted to said one of the nested trays of the push back storage rack.

The maintenance and retrieval cart further comprises a brake mechanism for operative braking engagement with the rollers. A fork pocket is mounted to the base for removable lifting engagement with a lifting fork of a lifting device. A locking mechanism is provided for releaseably locking the cart to the push back storage rack.

A method of clearing a jam of items in a push back storage rack having a plurality of nested trays riding on a pair of inclined rails comprises the following steps. A lane adjacent to the jammed storage rack must be empty. There first step is loading a maintenance and retrieval cart onto a lifting machine having lifting forks by inserting the lifting forks into a corresponding lift fork pocket mounted to a base of the maintenance and retrieval cart. The maintenance and retrieval cart is then lifted into a position aligned with an exposed end of the incline rails of the lane of the push back rack adjacent to the location of the jam. The maintenance and retrieval cart is then locked to the inclined rails by engaging a locking mechanism. The next step is actuating the drive means to move the maintenance and retrieval cart to a position adjacent to the items in the jam. The brake mechanism is applied in operative engagement with the rollers to prevent movement of the maintenance and retrieval cart along the incline rails. The jam is manually cleared. Any fallen items are removed from the site of the jam and loaded into the maintenance and retrieval cart for retrieval. The brake mechanism is disengaged and the maintenance and retrieval cart is returned to the exposed end and scissor lift location of the incline rails. The product is then transferred from the maintenance and retrieval cart to the scissor lift.

Once the scissor lift has been loaded with the fallen product, the operator can then transition onto the scissor lift and then can be lowered to the floor level at which time the scissor lift can be unloaded. Once the jam has been cleared and the maintenance and retrieval cart locking pins have been disengaged, the lifting forks of the fork truck are inserted into the maintenance and retrieval cart fork lift pockets, and then lifted from the inclined rails. The maintenance and retrieval cart is then lowered to the floor.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF THE PREFERRED EMBODIMENT

Figure 4:
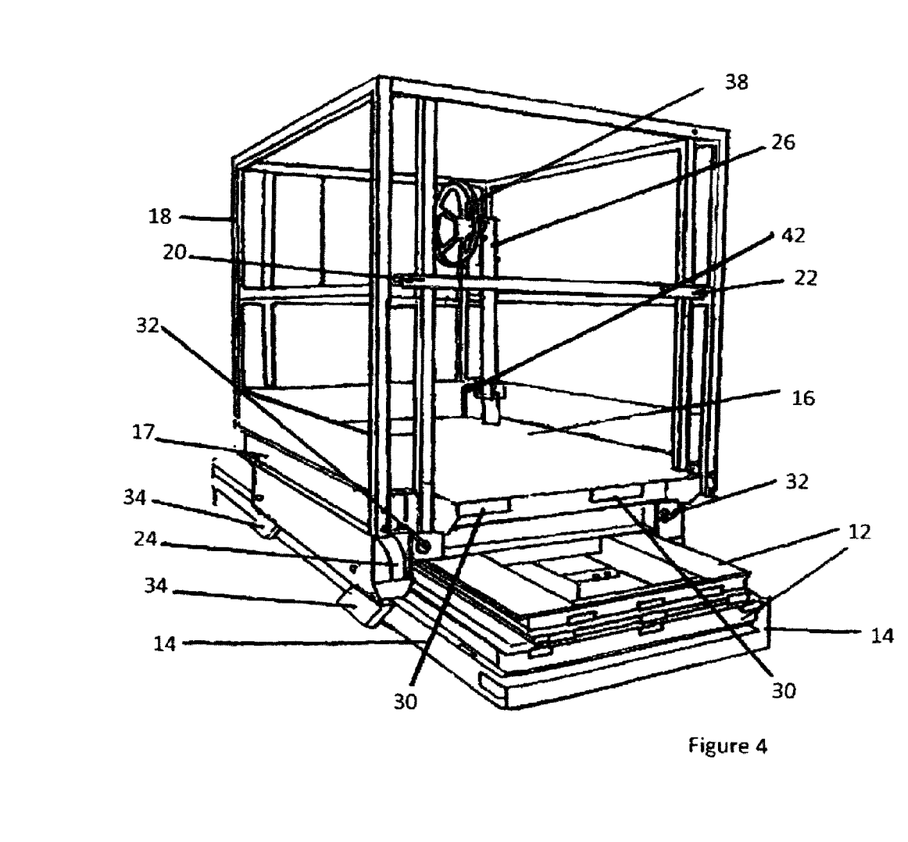
FIG. 4 is a perspective view of a maintenance and retrieval cart according to a first embodiment of the present invention.
Figure 5:
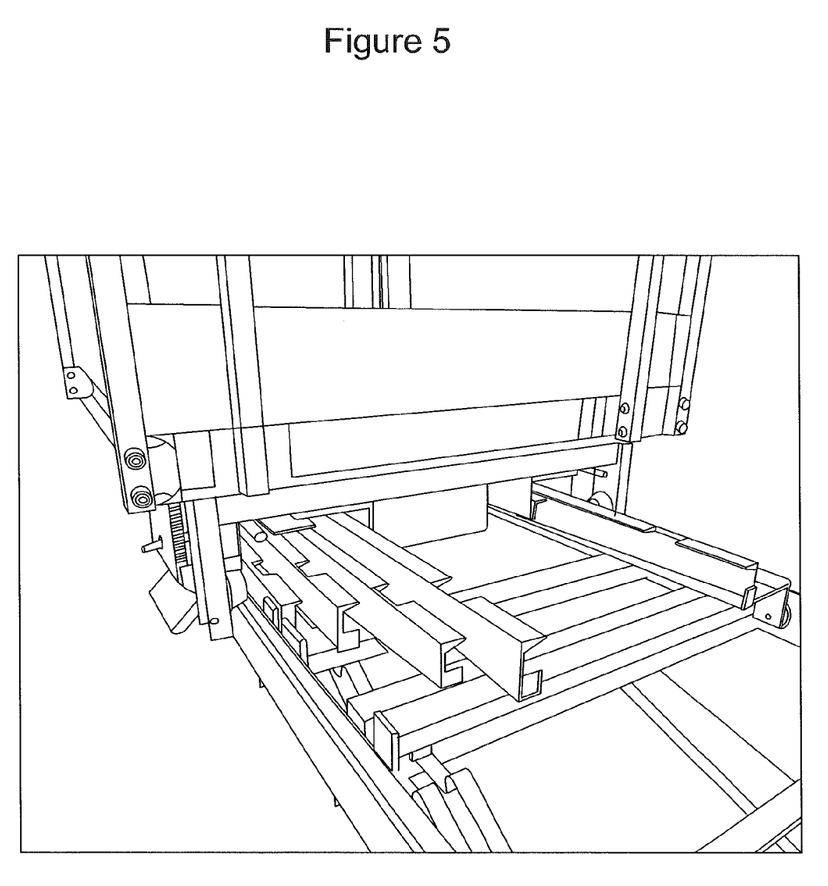
FIG. 5 is a perspective view of the cart according to the first embodiment of the present invention shown in position on the rails of a racking system.
Figure 6:
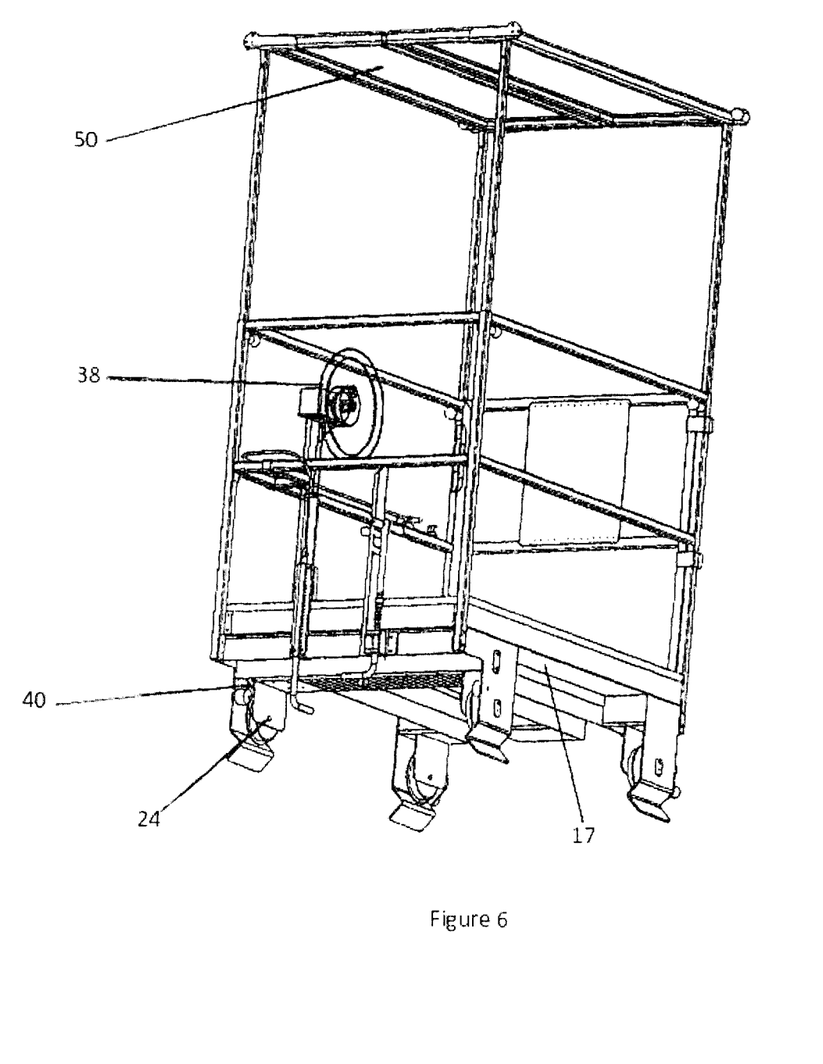
FIG. 6 is a perspective view of a maintenance and retrieval cart according to a first embodiment of the present invention.

With reference to FIGS. 4 and 5 of the drawings, a maintenance and retrieval cart, shown generally by reference numeral 10, is provided for use with a push back storage rack having a plurality of nested trays 12 riding on a pair of inclined rails 14. The maintenance and retrieval cart 10 comprises a base 16 with a safety rail 18 secured thereto. The safety rail 18 is preferably constructed to extend to a sufficient height to prevent an operator from falling over the rail. The safety rail may advantageously also be provided with a middle rail 20. The safety rail can be constructed in interlocking segments so that the height of the safety rail 18 can be adjusted The cart 10 may be fitted with an overhead safety canopy 50 to shelter an operator from objects which might fall off of nearby rack trays during a maintenance and retrieval operation. This feature is shown by reference numeral 50 in FIG. 6. As can be seen in FIG. 4, the rail can be fitted with a removable end portion to permit an operator to enter into and leave the cart 10. The cart 10 further comprises fall arrest anchors 22. The fall arrest anchors can be mounted to the base 16.

A fork pocket 30 is mounted to the undercarriage 17 for removable lifting engagement with a lifting fork of a lifting device. A locking mechanism 32 is provided for releaseably locking the cart 10 to the push back storage rack. In the embodiment shown in FIG. 4, the locking mechanism 32 comprises a set of manually activated lock pins which located at either end of the cart 10 and engage the rail 14 of the push back storage rack. It should be understood that variations could be made in the position and mode of operation of the locking means in order to ensure that the cart 10 can be releaseably locked to the push back rack systems manufactured by the various manufacturers in the industry. Modifications such as changing the positioning of the lock pins on the cart 10 to engage different rack trays or rails, or changing the location or type of actuator for the locking mechanism would be obvious to a person skilled in the art.

A rail guide 34 is mounted to the base adjacent to each one of the rollers 24. The rail guides 34 serve to guide the cart 10 onto the inclined rails 14 during loading of the cart and to provide added stability to the cart while it travels the inclined rails. A kick plate 36 is secured to the base and the safety rail for added safety and stability.

The base 16 is supported by an undercarriage 17 that facilitating movement along said inclined rails of the push back rack system. There are two embodiments of this aspect of the invention.

In the first embodiment which is shown in FIG. 4, the undercarriage comprises cart rollers 24 sized and positioned to ride on the inclined rails 14 of the push back rack system. The drive mechanism comprises a manually operable drive wheel 38 operatively engaged to a traveler 40 which is geared to one of the rollers 24. An operator can move the cart 10 by cranking the drive wheel 38. Other drive mechanisms, both mechanized and manual, could be employed within the scope of the invention. A preferred mechanized drive mechanism would be powered torquing device such as a hand drill.

A brake mechanism is provided to prevent the cart 10 from moving along the inclined track when it is not under drive by the drive mechanism. A variety of known brake mechanisms could be used without departing from the scope of the present invention. For example, single or double ratchet brakes could be used, and the release mechanism could be hand operated or foot pedal operated. For illustration purposes, a double ratchet brake was employed in the cart 10 shown in FIG. 4, with the brake release of the brake mechanism indicated by reference numeral 42. Although it is not shown in the drawings, another preferred arrangement is the use of a single ratchet brake and gravity activated locking pawl, with a hand held release. When a hand drill is used to operate the drive mechanism, the braking function will be provided by clutching in the drill.

Figure 7:
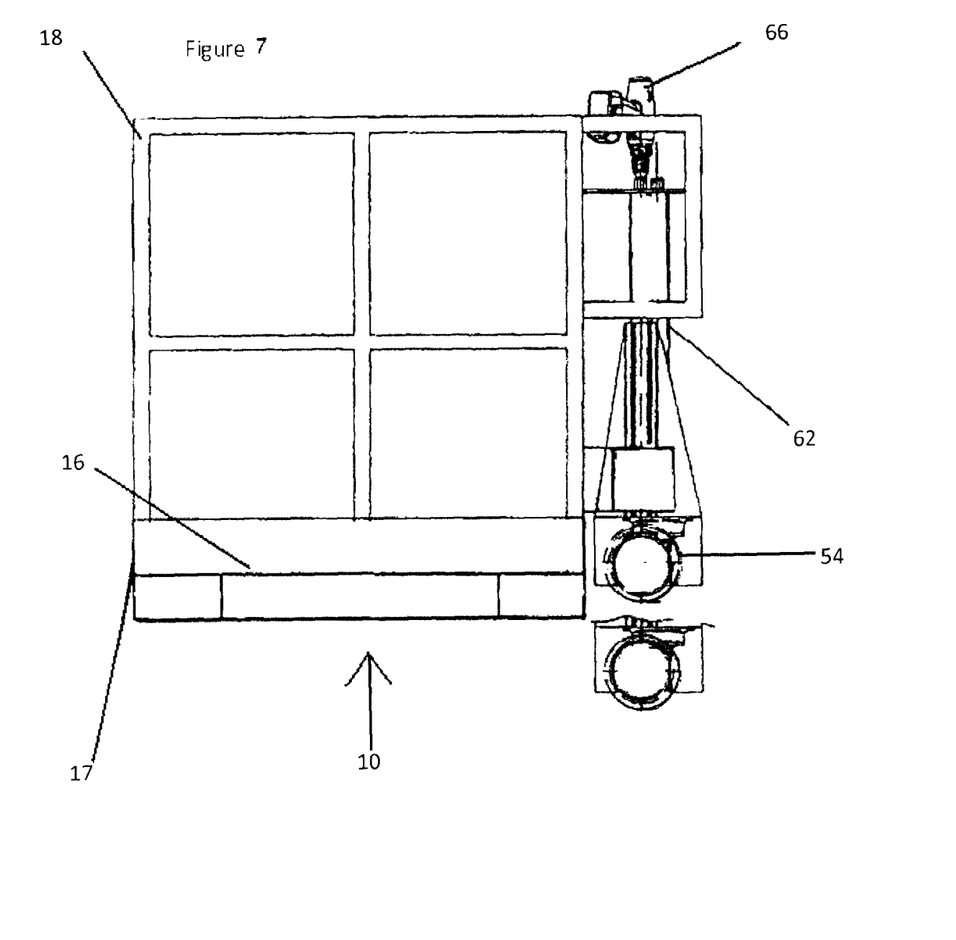
FIG. 7 is a side view of a maintenance and retrieval cart according to a second embodiment of the present invention.
Figure 8:
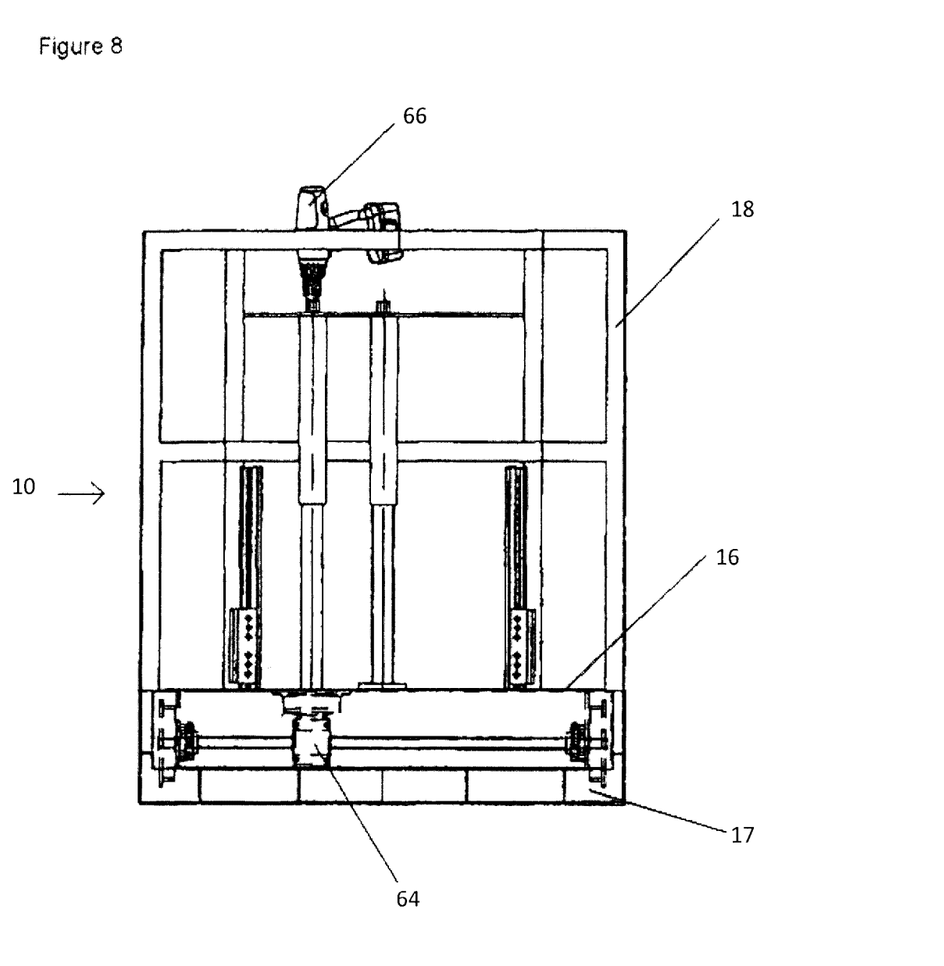
FIG. 8 is a front view of the cart of FIG. 7.
Figure 9:
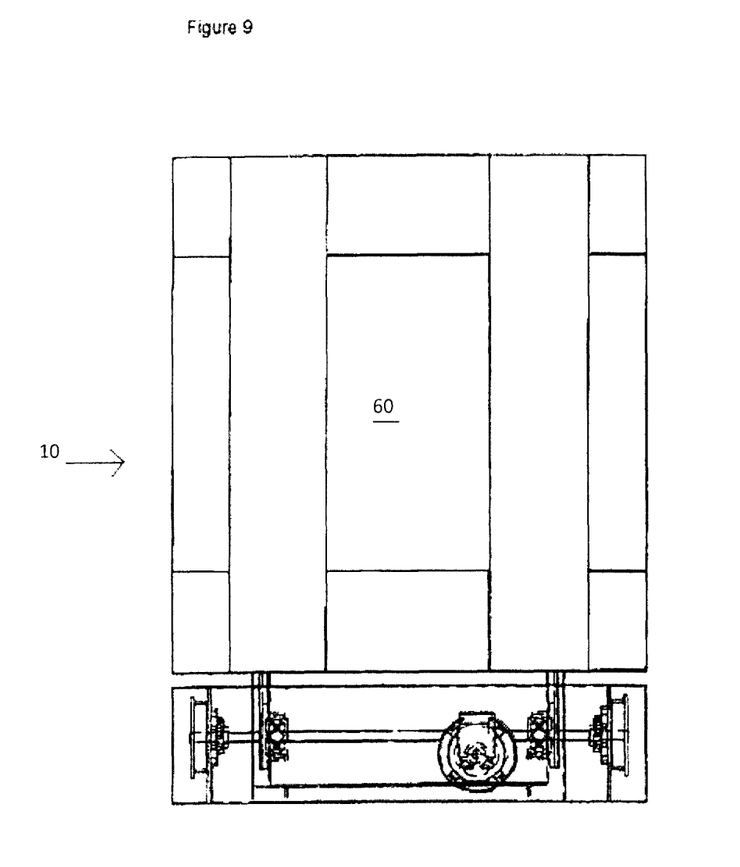
FIG. 9 is a bottom view of the cart of FIG. 7.

In the second embodiment, which is shown in FIGS. 7-9, the undercarriage 17 comprises a mounting surface 60 for removably resting on one of the nested trays 12 of the push back storage rack. The weight of the maintenance and retrieval cart is fully borne by the nested tray 12. In its simplest form, the drive mechanism may comprise a drive wheel operatively engaged to a traveler geared to a roller mounted to said one of the nested trays of the push back storage rack.

Alternatively, as shown in FIGS. 7-9, a separate roller drive 60 with an attached roller means 62 can be attached to the maintenance and removal cart 10 and lowered into contact with the rails 14. The separate roller drive 62 is a modular, self-contained and has its own drive wheels 64. The roller drive 62 is vertically adjustable and can be connected to the front of the maintenance and retrieval cart using a support frame connected to linear bearings, which in turn is mounted to the maintenance and retrieval cart. As best seen in FIG. 7, this modular roller drive system 62 must be in the vertically raised position when placing the maintenance and retrieval cart on the push back trays to ensure adequate clearance when loading. The modular roller drive 62 is then driven vertically down until the drive wheels 64 contact the push back tray rails 14 and adequate load is applied to ensure traction is available to drive the system either forward or backward. The roller drive 62 is activated either by rotating a manual drive wheel or engaging a DC powered drive system, such as a drill drive 66 to move the maintenance and retrieval cart 10 either forward to backward. With the DC powered drive system 66, an overload clutch is integrated to the drive train to ensure mechanical damage does not occur should the maintenance and retrieval cart 10 stop suddenly. The DC powered drive system in combination with the drive train components become the mechanism to prevent forward or backward movement unless activated by means of an operator controlled switch. With the manual drive wheel alternative, the overload clutch is replaced with a ratchet brake and gravity lock pin to ensure the maintenance and retrieval cart cannot roll inadvertently backward.

The cart 10 in accordance with the present invention was designed to allow for safe maintenance and jam removal in conformance with the following regulations/standards The cart is available with two options.

Option one: stand alone maintenance and retrieval cart which can only be lifted to the rail by fork truck. Once in position, the operator takes the scissor lift and lines up to the maintenance and retrieval cart then transfers onto the cart. The cart transfers the jammed product onto the scissor lift then transitions onto the scissor lift to then lower and unload the product.

Option two: the maintenance and retrieval cart is incorporated into the scissor lift or other man lift and becomes an integral part of the lift. A lift truck is no longer needed to lift the cart into position. Once the cart has been put onto the rails and the operator has transitioned onto the cart, the scissor lift is then inoperable as it will no longer be interlocked to the cart. Only when the cart has returned to the scissor lift and once again engaged to each other, the scissor lift will then operate.

A method of cleaning a jam will now be described in detail. The particulars of the method are described and illustrated with reference to the embodiment of the cart 10 shown in FIG. 4, but it should be understood that the method is applicable to use of the second embodiment of the cart 10 as illustrated in FIGS. 7-9, with variations in keeping with the deployment of the modular roller drive 62 described above.

It is important to keep bystanders or visitors away from the work area while clearing the jam, as distractions can cause accidents. It is advisable to place safety cones around the work area to ensure than no collision occurs between the lift machine and any other machinery. The individual operating the maintenance and retrieval cart 10 according to the present invention should be anchored to the cart 10 by a safety harness (fall restraint) prior to starting a clearing operation. Only persons trained and competent in working at heights should utilize the cart 10. The cart 10, the lift machine or lift truck and the fall restraint should be inspected prior to every use. The capacity of the lift machine and the cart 10 should be confirmed before commencing use.

Before clearing a jam it is important to conduct a comprehensive site assessment. The scope of the of the jam must be determined, including the location of the debris causing the jam, the number of storage lanes involved, the weights of the

| | | |
|---|---|---|
| Design | Ontario Occupational Health and Safety Act & Regulation 851 Applicable Sections CAN/CSA Z432-04 (R2004) Machinery Guarding Applicable Sections National Building Code of Canada P It 4 | OSHA Occupational Safety and Health Administration 1910 Subpart D - Walking-working surfaces OSHA Occupational Safety and Health Administration 1910 Subpart N |
| Fabrication | CAN/CSA W47.1-09 Certification 0 companies for fusion welding o steel CAN/CSA W59 03 (R2fl08) Welded Steel Construction (Metal Arc welding) CAN/CSA S16 Design Of Steel structures CAN/CSA S136 North American Specification for the Design of Cold Formed Steel Structural Members Canadian Welding Bureau | ANSI/AWS D1.6/D1.6M:2007 Structural Welding Code - Stainless Steal Structural steel shall conform with the requirements of Steel bolts - ANSI B18.2.1 and B18.2.2 Nuts and Washers - ANSI/ASTM A325M ANSI/AISC Specification for the design of steel buildings AWS Welding Code |
| Fall Protection | Z259.16-04 (R2009), Design of Active Fall-protection SystemsZ259.15, Anchorage Connectors (Under Development) | Work Positioner Standard, EN 1757-1 ANSI Z359-06 Specification and design requirements for active fail protection systems |
| Work Platforms | Z271-10, Safety Code for Suspended Elevating Platforms Z259.15, Anchorage Connectors (Under Development) | Work Positioner Standard, EN 1757-1 ANSI Z359-06 Specification and design requirements for active fall protection systems |
| Racking | Racking Manufacturers institute A344.1-05/A344.2-05 User Guide for Stool Storage Racks/Standard for the Design and Construction of Steel Storage Racks | ANSI/RMI MH 16.1-2004 Specification For The Design, Testing and Utilization of Industrial Steel Storage Racks | items of debris to be cleared. A clearing plan should be formulated and a job safety analysis should be conducted.

Next, it is necessary to clear the aisle adjacent to the section of storage racking in which the jam is located. Standard material handling equipment is used to empty any pallets of stored product from the lane/bay adjacent to the rack which is to be cleared. The jammed load must be secured to prevent the load rolling under gravity when the jam is cleared. The work area must be property secured and safety cones and caution tape should be set up to delineate the work area, and the work area should be properly lit for safety reasons.

It is important for the operator to know the capacity of both the lift machine and the cart 10 before use. The cart 10 is then secured onto the forklift. The cart 10 has standard fork truck pockets to permit it to be supported on the forks. The cart 10 should be aligned to face forwardly (with the drive wheel 38 facing into the emptied lane/bay). The cart 10 should be level on the fork lift and should not be permitted to tilt forward. The cart 10 is then raised to the level of the rails 14 where the jam is located. Using the forklift, the cart 10 is moved forward into position in aligned engagement on the rails 14. The operator should then use a scissor lift for personal transportation to the cart 10 while it is engaged on the rails. From the scissor lift, the operator manually locks the cart 10 into place on using the spring loaded locking pins 32. The locking pins lock the cart onto the top one of the nested tray 12, this lock will eliminate the chance of tipping over on the rails. The cart has two stop plates at each wheel front and back. The scissor lift should be positioned to ensure there is minimal gap between the scissor lift and the cart 10. Rail guides 34 are provided on the cart 10 to facilitate the transfer of the cart 10 from the lift machine to the rails 14. Using 100% tie off at all times the operator will then exit the scissor lift and enter the cart 10. The operator will then tie off to the engineered anchors at each corner of the cart 10.

The operator will crank the drive wheel 38 of the manual drive system to manually power the cart 10 along the rails The drive wheel 38 located at the front of the cart 10 and it is cranked until the cart 10 reaches a position adjacent to the jammed items to be cleared. Once in position, the operator engages the single ratchet and gravity activated locking pawl mechanism to ensure that the cart 10 will not roll out of position.

The operator, while standing safely within the cart 10, will then manually clear the debris items from the adjacent (jammed) lane/bay. Care should be taken not to overreach, to maintain proper footing and balance at all times. A telescopic reaching tool can be employed to grasp hard to reach items. The collected debris is loaded into the cart 10 for transfer back to the scissor lift. In order to move the cart 10 away from the site adjacent the (now cleared) jam, the operator releases the brake mechanism. The cart 10 will then roll along the rail 14 under gravity to return to a position at the outer edge of the rails, adjacent the scissor lift.

To remove the cart 10 from the rails, the scissor lift is moved into position with a minimal gap between the scissor lift and the cart 10. The cart is brought to rest on the forks of the scissor lift by engagement thereof within the fork pockets of the cart 10. Once the stand alone cart is placed onto the rails by the lift truck, the operator then takes the scissor lift up to the cart level and lines up the scissor lift to the cart. He or she then transitions onto the cart. Option two as mentioned above incorporates the scissor lift and the cart which will then eliminate the use of a lift truck to lift the cart. In option two, the scissor lift and cart become one integrated unit. Using 100% tie off at all times the operator exits the cart 10 and enters the scissor lift. Once tied off to the scissor lift, the operator manually unlocks the cart 10 by releasing the spring loaded locking pins which secured the cart 10 to the rails. When the cart is secured on the fork lift in a level, not tilted alignment, and the rail guides are clear of the racking structure, the fork lift is moved in the reverse direction to disengage the cart 10 from the rack structure. The cart 10 is then lowered to ground level.

The method of clearing a jam using us a maintenance and retrieval cart according to the second embodiment of the present invention is analogous to the method recited above, with the exception that separate roller drive 62 is connected to the maintenance and retrieval cart using a support frame connected to linear bearings, which in turn is mounted to the maintenance and retrieval cart. The cart 10, with the roller drive 62 attached, is lifted into proximity with the push back tray of the racking system. The roller drive 62 must be in the vertically raised location when positioning the maintenance and retrieval cart on the push back tray to ensure adequate clearance when loading. The roller drive 62 is then driven vertically down until the drive wheels 64 contact the push back tray rails 14 and adequate load is applied to ensure traction is available to drive the system either forward or backward. After the cart is deployed to clear a jam as outlined above, the removal of the cart 10 from the push back tray and return to ground level can be accomplished by reversing these steps.

The maintenance and retrieval cart according to the present invention can be deployed in the manner described above to provide access to the push back system and the surrounding rack structure to safely carry out inspections, maintenance, and repairs.

While there has been shown and described what are at present considered the preferred embodiments of the invention, it will be obvious to those skilled in the art that various changes and modifications can be made therein without departing invention defined by the appended claims.

We claim:

1. A maintenance and retrieval cart for use with a push back storage rack having a plurality of nested trays riding on a pair of inclined rails, said maintenance and retrieval cart comprising:
    a base having mounted thereto a safety rail;
    an undercarriage supporting the base and facilitating movement along said inclined rails; and
    a drive mechanism operable from said base, the drive mechanism being operatively connected to move the cart along said inclined rails.

2. The maintenance and retrieval cart of claim 1 further comprising a fork pocket mounted to the base for removable lifting engagement with a lifting fork of a lifting device.

3. The maintenance and retrieval cart of claim 1 further comprising a kick plate secured to secure to the perimeter of the base and the hand rail.

4. The maintenance and retrieval cart of claim 2 further comprising a locking mechanism to releasably lock the cart to the push back storage rack.

5. The maintenance and retrieval cart of claim 3 further comprising fall arrest anchors.

6. The maintenance and retrieval cart of claim 1 wherein the undercarriage comprises cart rollers sized and positioned to ride on said inclined rails.

7. The maintenance and retrieval cart of claim 6 further comprising a brake mechanism for operative braking engagement with the cart rollers.

8. The maintenance and retrieval cart of claim 7 further comprising a rail guide mounted to the base adjacent each of the cart rollers.

9. The maintenance and retrieval cart of claim 8 wherein the drive mechanism comprises a drive wheel operatively engaged to a traveler geared to one of the cart rollers.

10. The maintenance and retrieval cart of claim 9 wherein the drive wheel is manually operable.

11. The maintenance and retrieval cart of claim 1 wherein the undercarriage comprises a mounting surface for removably resting on one of the nested trays of the push back storage rack.

12. The maintenance and retrieval cart of claim 11 wherein the drive mechanism comprises a drive wheel operatively engaged to a traveler geared to a roller mounted to said one of the nested trays of the push back storage rack.

13. The maintenance and retrieval cart of claim 12 wherein the drive wheel is manually operable.

14. The maintenance and retrieval cart of claim 13 wherein the drive wheel is operable by a mechanized device.

15. A method of clearing a jam of items in a push back storage rack having a plurality of nested trays riding on a pair of inclined rails comprises the steps of:
   loading a maintenance and retrieval cart onto a lifting machine having lifting forks by inserting the lifting forks into a corresponding lift fork pocket mounted to a base of the maintenance and retrieval cart;
   lifting the maintenance and retrieval cart into a position aligned with an exposed end of the incline rails of the push back rack in a lane adjacent to the location of the jam;
   locking the maintenance and retrieval cart to the inclined rails by engaging a locking mechanism;
   actuating a drive means to move the maintenance and retrieval cart to a position adjacent to the items in the jam;
   applying a brake mechanism in operative engagement with the rollers to prevent movement of the maintenance and repair cart along the incline rails;
   manually clearing the jam;
   disengaging the brake mechanism; and
   returning the maintenance and retrieval cart to the exposed end of the incline rails.

16. The method of claim 15 further comprising the steps of:
   inserting the lifting forks into the lift fork pocket;
      removing the locking pins;
      releasing the maintenance and retrieval cart from the inclined rails; and
   lowering the maintenance and retrieval cart is lowered to the ground.

17. A maintenance and retrieval cart for use with a push back storage rack having a plurality of nested trays riding on a pair of inclined rails, said maintenance and retrieval cart comprising:
   a base having mounted thereto a safety rail;
   an undercarriage supporting the base and facilitating movement along said inclined rails, wherein the undercarriage comprises cart rollers sized and positioned to ride on said inclined rails;
   a drive mechanism operatively connected to move the cart along said inclined rails, wherein the drive mechanism comprises a drive wheel operatively engaged to a traveler geared to one of the cart rollers and wherein the drive wheel is manually operable;
   a brake mechanism for operative braking engagement with the cart rollers; and
   a rail guide mounted to the base adjacent each of the cart rollers.

18. The maintenance and retrieval cart of claim 17 wherein the undercarriage comprises a mounting surface for removably resting on one of the nested trays of the push back storage rack.

19. The maintenance and retrieval cart of claim 18 wherein the drive mechanism comprises a drive wheel operatively engaged to a traveler geared to a roller mounted to said one of the nested trays of the push back storage rack.

20. The maintenance and retrieval cart of claim 19 wherein the drive wheel is manually operable.

21. The maintenance and retrieval cart of claim 20 wherein the drive wheel is operable by a mechanized device.

* * * * *